(12) United States Patent
Cheung et al.

(10) Patent No.: US 10,166,904 B1
(45) Date of Patent: Jan. 1, 2019

(54) SINGLE COMPONENT CUP HOLDER MECHANISM

(71) Applicant: GM GLOBAL TECHNOLOGY OPERATIONS LLC, Detroit, MI (US)

(72) Inventors: Ming Chun Cheung, Warren, MI (US); Kenton L. West, Orion, MI (US); Christopher P. Meyers, Warren, MI (US); Douglas Amick, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 15/622,719

(22) Filed: Jun. 14, 2017

(51) Int. Cl.
*B60N 3/10* (2006.01)

(52) U.S. Cl.
CPC ............ *B60N 3/102* (2013.01); *B60N 3/108* (2013.01)

(58) Field of Classification Search
CPC ............................... B60N 3/102; B60N 3/108
USPC ....................................................... 296/24.34
See application file for complete search history.

(56) References Cited

U.S. PATENT DOCUMENTS

| 5,988,579 | A  | * | 11/1999 | Moner, Jr. | ............. | B60N 3/102 224/926 |
| 6,092,775 | A  | * | 7/2000  | Gallant    | ............... | B60N 3/106 224/926 |
| 6,230,948 | B1 | * | 5/2001  | Steiger    | ............... | B60N 3/102 224/539 |
| 6,779,770 | B2 | * | 8/2004  | Kaupp      | ............... | B60N 3/101 224/926 |
| 7,036,785 | B2 | * | 5/2006  | Moyer      | ............... | B60N 3/102 224/282 |
| 7,585,021 | B2 | * | 9/2009  | Tabata     | ............... | B29C 44/1257 297/188.14 |
| 8,181,928 | B2 | * | 5/2012  | Ruan       | ............... | F16B 7/0433 248/222.11 |
| 8,540,297 | B2 | * | 9/2013  | Browne     | ............... | B60N 3/102 296/24.34 |
| 9,204,747 | B1 | * | 12/2015 | Starr      | ............... | F16M 13/02 |
| 9,216,693 | B2 | * | 12/2015 | Poindexter, Jr. | ........ | B60R 7/04 |
| 9,597,991 | B2 | * | 3/2017  | Amick      | ............... | B65D 43/16 |
| 9,751,460 | B1 | * | 9/2017  | Iordache   | ............... | B60Q 3/64 |
| 2014/0339846 | A1 | * | 11/2014 | Masuda   | ............... | B60N 3/102 296/37.8 |

(Continued)

FOREIGN PATENT DOCUMENTS

DE  102015122084 A1 *  6/2017
WO  WO-2017149256 A1 *  9/2017 ............. B60N 3/104

*Primary Examiner* — Pinel E Romain
(74) *Attorney, Agent, or Firm* — Lorenz & Kopf, LLP

(57) ABSTRACT

Cup holder mechanisms are provided for vehicles that include, in one example, an upper region, a base region, and a middle region. The upper region includes an outer ring configured to receive a beverage by at least partially surrounding a perimeter of the beverage. The base region includes a base support element configured to support a bottom of the beverage. The middle region connects the upper region and the base region. The cup holder mechanism is configured to be movable, by an actuator based on input provided by an occupant of the vehicle, between: a closed position, in which the cup holder mechanism is stowed in a recess within a housing; and an open position, in which the cup holder mechanism is opened outside the housing to receive the beverage. The upper region, the base region, and the middle region are formed as a single unitary piece.

20 Claims, 4 Drawing Sheets

(56) References Cited

U.S. PATENT DOCUMENTS

| | | | | |
|---|---|---|---|---|
| 2015/0115650 A1* | 4/2015 | Zhang | ................... | B60N 3/102 296/152 |
| 2016/0059761 A1* | 3/2016 | Bohlke | ................. | B60N 3/102 296/37.8 |
| 2016/0362029 A1* | 12/2016 | Masatsugu | ............. | B60N 3/102 |
| 2017/0240085 A1* | 8/2017 | Ferreira Orta | ........... | B60N 3/10 |

\* cited by examiner

SINGLE COMPONENT CUP HOLDER MECHANISM

TECHNICAL FIELD

The technical field generally relates to vehicles and, more specifically, to cup holder systems for vehicles.

BACKGROUND

Many vehicles include cup holders for the driver and/or passengers to place beverages. However, in certain situations improved cup holders may be desired.

Accordingly, it is desirable to provide improved cup holders and/or associated systems for vehicles to place beverages. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a cup holder mechanism for a vehicle is provided. The cup holder mechanism includes an upper region, a base region, and a middle region. The upper region includes an outer ring configured to receive a beverage by at least partially surrounding a perimeter of the beverage. The base region includes a base support element configured to support a bottom of the beverage. The middle region connects the upper region and the base region. The cup holder mechanism is configured to be movable, by an actuator based on input provided by an occupant of the vehicle, between a closed position, in which the cup holder mechanism is stowed in a recess within a housing, and an open position, in which the cup holder mechanism is opened outside the housing to receive the beverage. The upper region, the base region, and the middle region are formed as a single unitary piece.

Also in one embodiment, the cup holder mechanism is configured to be stored in a center console of the vehicle, between a driver seat and a passenger seat of the vehicle.

Also in one embodiment, the upper region further includes a connecting region coupling the outer ring to the middle region, wherein the outer ring is configured to expand, via the connecting region, to accommodate beverages of different widths.

Also in one embodiment, the base support element includes: a first base support element component configured to contact the bottom of the beverage; and a second base support element component connected to and disposed beneath the first base support element component, with a step formed between the first base support element component and the second base support element component.

Also in one embodiment, the middle region includes: a plurality of protrusions extending from the upper region; and a four bar assembly coupling the plurality of protrusions to the base support element.

Also in one embodiment, the middle region further includes one or more living hinge systems.

Also in one embodiment, the one or more living hinge systems include: a first living hinge system coupled between each of the plurality of protrusions and the four bar assembly; and a second living hinge system coupled between the four bar assembly and the base support element.

In accordance with another exemplary embodiment, a cup holder system for a vehicle is provided. The cup holder system includes a housing, a cup holder mechanism, an input device, and an actuator. The housing has a recess formed therein. The cup holder mechanism includes an upper region, a base region, and a middle region. The upper region includes an outer ring configured to receive a beverage by at least partially surrounding a perimeter of the beverage. The base region includes a base support element configured to support a bottom of the beverage. The middle region connects the upper region and the base region. The upper region, the base region, and the middle region are formed as a single unitary piece. The input device is configured to receive an input from an occupant of the vehicle. The actuator is configured to, based upon the input received by the input device, to facilitate movement of the cup holder mechanism between: a closed position, in which the cup holder mechanism is stowed in the recess within the housing; and an open position, in which the cup holder mechanism is opened outside the housing to receive the beverage.

Also in one embodiment, the cup holder mechanism is configured to be stored in a center console of the vehicle, between a driver seat and a passenger seat of the vehicle.

Also in one embodiment, the upper region further includes a connecting region coupling the outer ring to the middle region, wherein the outer ring is configured to expand, via the connecting region, to accommodate beverages of different widths.

Also in one embodiment, the base support element includes a first base support element component and a second base support element component. The first base support element component configured to contact the bottom of the beverage. The second base support element component is connected to and disposed beneath the first base support element component, with a step formed between the first base support element component and the second base support element component.

Also in one embodiment, the middle region includes a plurality of protrusions extending from the upper region; and a four bar assembly coupling the plurality of protrusions to the base support element.

Also in one embodiment, the middle region further includes one or more living hinge systems.

Also in one embodiment, the one or more living hinge systems include a first living hinge system coupled between each of the plurality of protrusions and the four bar assembly; and a second living hinge system coupled between the four bar assembly and the base support element.

In accordance with a further exemplary embodiment, a vehicle is provided. The vehicle includes a driver seat, a passenger seat, a center console, and a cup holder system. The cup holder system includes a housing, a cup holder mechanism, an input device, and an actuator. The housing has a recess formed therein. The cup holder mechanism is disposed within the center console, and includes an upper region, a base region, and a middle region. The upper region includes an outer ring configured to receive a beverage by at least partially surrounding a perimeter of the beverage. The base region includes a base support element configured to support a bottom of the beverage. The middle region connects the upper region and the base region. The upper region, the base region, and the middle region are formed as a single unitary piece. The input device is configured to receive an input from an occupant of the vehicle. The actuator is configured to, based upon the input received by the input device, to facilitate movement of the cup holder mechanism between: a closed position, in which the cup holder mechanism is stowed in the recess within the housing; and an open position, in which the cup holder mechanism is opened outside the housing to receive the beverage.

Also in one embodiment, the upper region further includes a connecting region coupling the outer ring to the middle region, wherein the outer ring is configured to expand, via the connecting region, to accommodate beverages of different widths.

Also in one embodiment, the base support element includes: a first base support element component configured to contact the bottom of the beverage; and a second base support element component connected to and disposed beneath the first base support element component, with a step formed between the first base support element component and the second base support element component.

Also in one embodiment, the middle region includes a plurality of protrusions extending from the upper region; and a four bar assembly coupling the plurality of protrusions to the base support element.

Also in one embodiment, the middle region further includes a plurality of living hinge systems.

Also in one embodiment, the one or more living hinge systems include: a first living hinge system coupled between each of the plurality of protrusions and the four bar assembly; and a second living hinge system coupled between the four bar assembly and the base support element.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
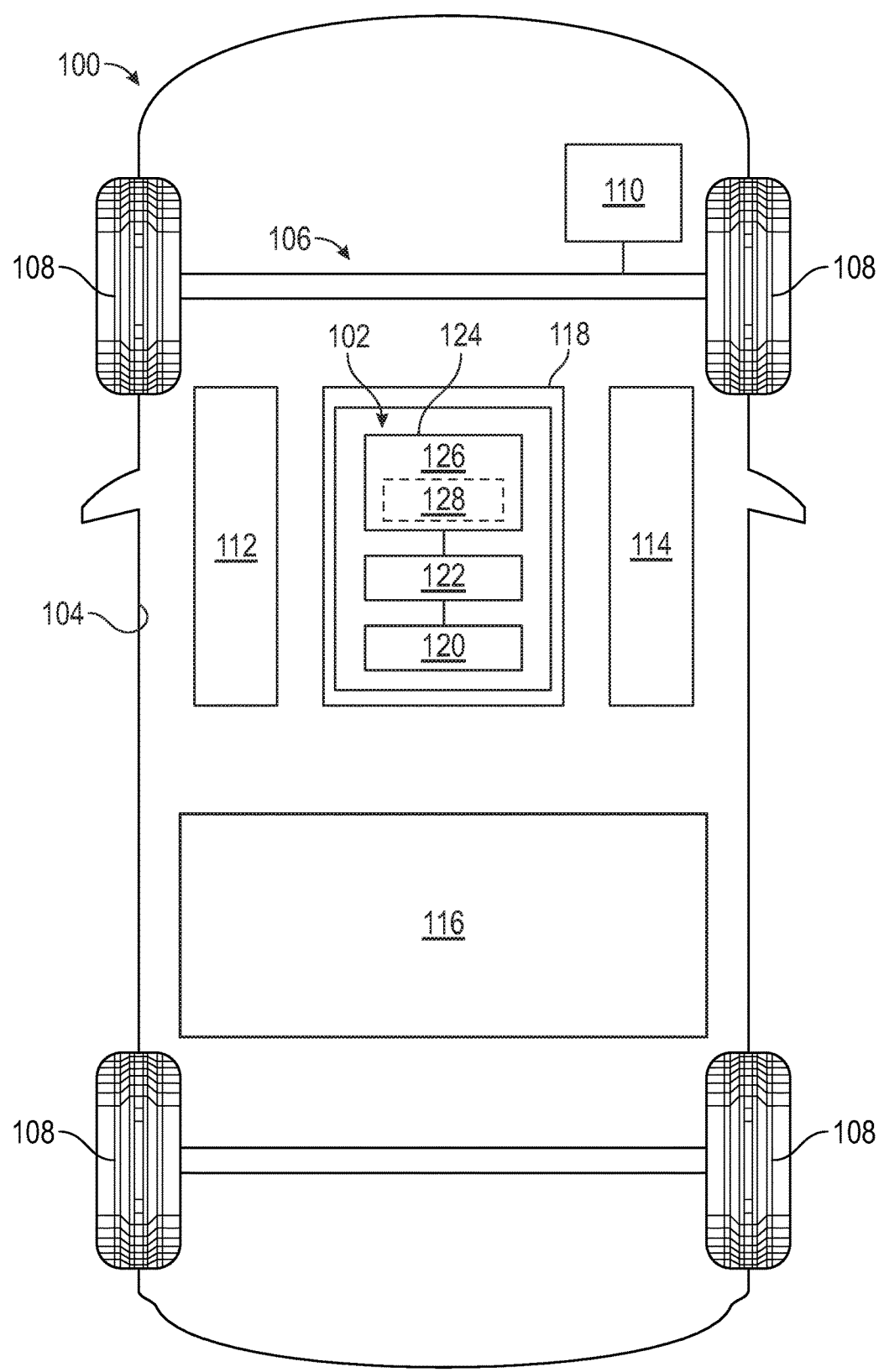
FIG. 1 is a functional block diagram of a vehicle that includes a cup holder system that includes a housing and a cup holder mechanism that is movable between an open position and a closed position, in accordance with an exemplary embodiment.

FIG. 1 illustrates a vehicle 100, according to an exemplary embodiment. As described in greater detail further below, the vehicle 100 includes a cup holder system 102 for holding beverages for one or more occupants (e.g., drivers and/or passengers) of the vehicle 100, for example as described in greater detail further below in connection with FIG. 1 as well as FIGS. 2-4. As used throughout this Application, the term beverage refers to beverages that include containers or vessels, as well as the containers or vessels themselves (regardless of whether they are filled with a beverage).

The vehicle 100 preferably comprises a land-based automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system.

The vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 108. The wheels 108 are each rotationally coupled to the chassis 106 near a respective corner of the body 104 to facilitate movement of the vehicle 100. In one embodiment, the vehicle 100 includes four wheels 108, although this may vary in other embodiments (for example for trucks and certain other vehicles).

Also as depicted in FIG. 1, in various embodiments, the vehicle 100 includes occupant seating that includes front seats 112, 114 (e.g., a front driver seat 112 and a front passenger seat 114, in one embodiment), one or more rear seats 116. Also in the depicted embodiments, the vehicle 100 also includes a center console 118 that is disposed between the front seats 112, 114 (e.g., between the front driver seat 112 and the front passenger seat 114, in one embodiment).

A drive system 110 is mounted on the chassis 106, and drives the wheels 108. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The cup holder system 102, as mentioned above, holds beverages for one or more occupants of the vehicle 100. In the depicted embodiment, the cup holder system 102 is disposed within the center console 118. However, in certain embodiments, the cup holder system 102 may be disposed within one or more other regions of the vehicle 100.

As depicted in FIG. 1, in one embodiment, the cup holder system 102 comprises a housing 124, a cup holder mechanism 128, an actuator 122, and an input device 120. In one embodiment, the housing 124 is formed within the center console 118; however, this may vary in other embodiments. Also in one embodiment, the housing 124 has a recess 126 formed therein.

In various embodiments, the cup holder mechanism 128 is movable, by the actuator 122, between an open position and a closed position. Also in various embodiments, when in the closed position, the cup holder mechanism 128 is stowed in the recess 126 within the housing 124, and does not hold a beverage. Conversely, when in the open position, the cup holder mechanism 128 is disposed outside the housing 124, in order to receive and hold a beverage of the vehicle occupant.

Also in various embodiments, the actuator 122 is coupled between the cup holder mechanism 128 and the input device 120, and moves the cup holder mechanism 128 between the open and closed positions based on inputs received from an occupant of the vehicle 100 via the input device 120. In one embodiment, the input device 120 comprises a button; however, this may vary in other embodiments.

As discussed in greater detail further below in connection with FIGS. 2-4, the cup holder mechanism 128 includes various components that are formed together, integrally, as a single piece, in various embodiments.

Figure 2:
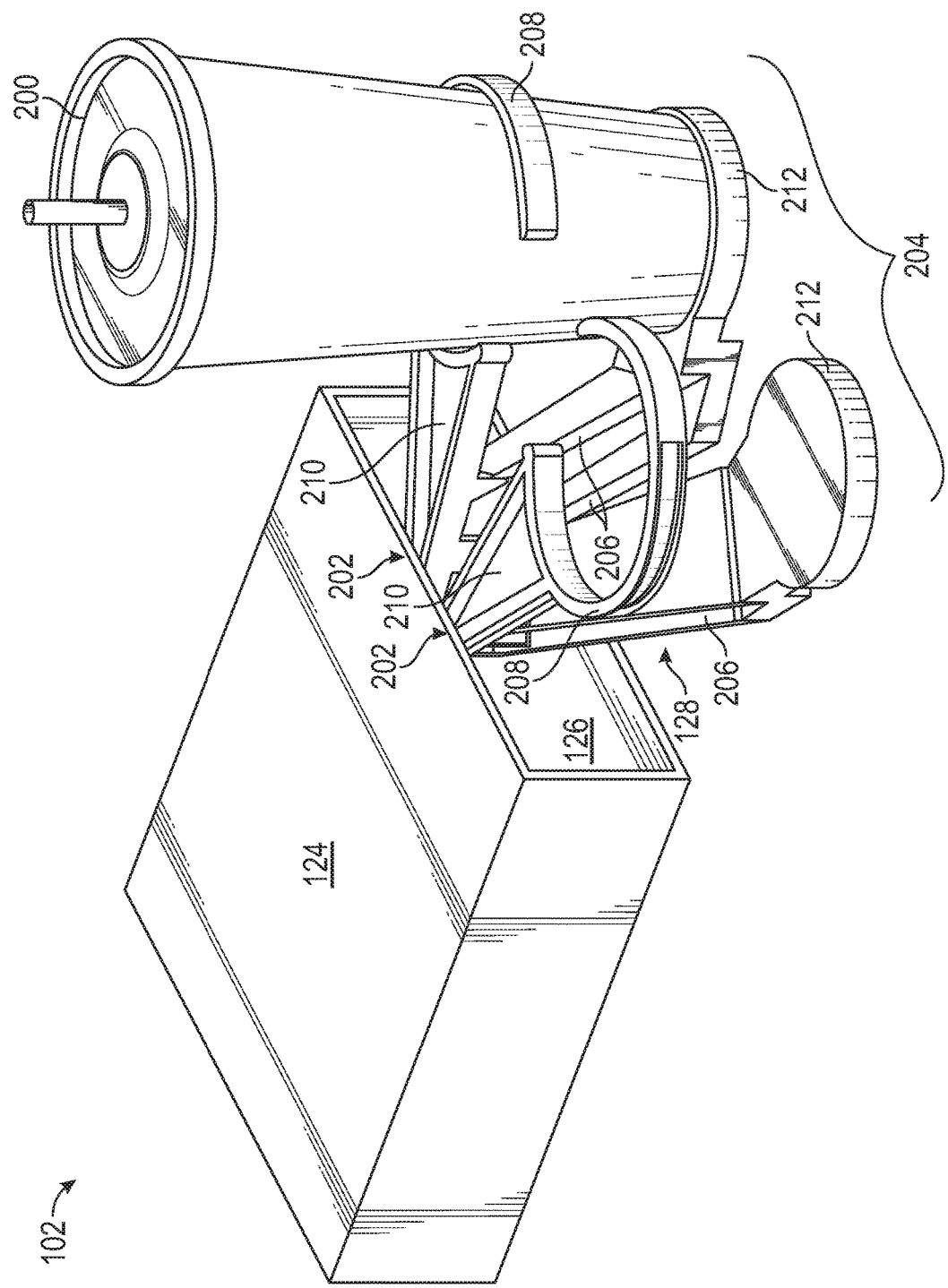
FIG. 2 is a schematic illustration of the cup holder system of FIG. 1, depicted in an open position, and depicted along with a beverage being held thereby, in accordance with an exemplary embodiment.

Specifically, FIG. 2 is a schematic illustration of the cup holder system 102 of FIG. 1, depicted in an open position, and depicted along with a beverage (also referred to as a beverage container) 200 being held thereby, in accordance with an exemplary embodiment. FIG. 3 is a schematic illustration of the cup holder mechanism 128 of the cup holder system 102 of FIGS. 1 and 2, depicted in a closed position, in accordance with an exemplary embodiment. FIG. 4 is a schematic illustration of the cup holder mechanism 128 of the cup holder system 102 of FIGS. 1 and 2, depicted in the open position of FIG. 2, in accordance with an exemplary embodiment.

As depicted in FIG. 2, in various embodiments, the cup holder mechanism 128 extends out from the housing 124, from the recess 126 thereof, when in the open position. The cup holder mechanism 128 will be in the open position of FIG. 2, for example, in various embodiments, after a vehicle occupant has engaged the input device 120 of FIG. 1 (e.g., by pressing a button), thereby causing the actuator 122 of FIG. 1 to move the cup holder mechanism 128 depicted in the open position of FIG. 2.

As shown in FIG. 2 (as well as in FIGS. 3 and 4), in various embodiments, the cup holder mechanism 128 includes an upper region 202, a base region 204, and a middle region 206. In various embodiments, the upper region 202, the base region 204, and the middle region are each formed together as a single, unitary piece.

Figure 3:
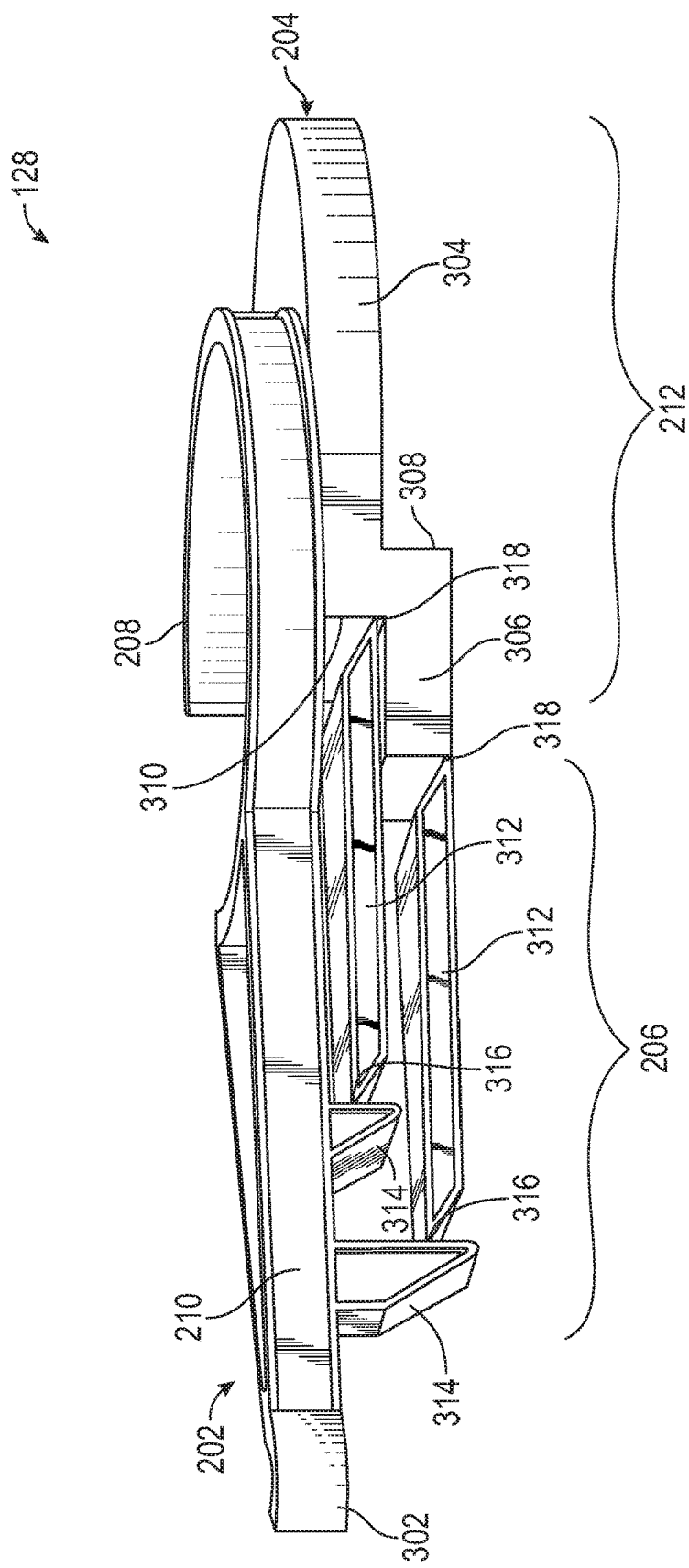
FIG. 3 is a schematic illustration of the cup holder mechanism of the cup holder system of FIGS. 1 and 2, depicted in a closed position, in accordance with an exemplary embodiment.
Figure 4:
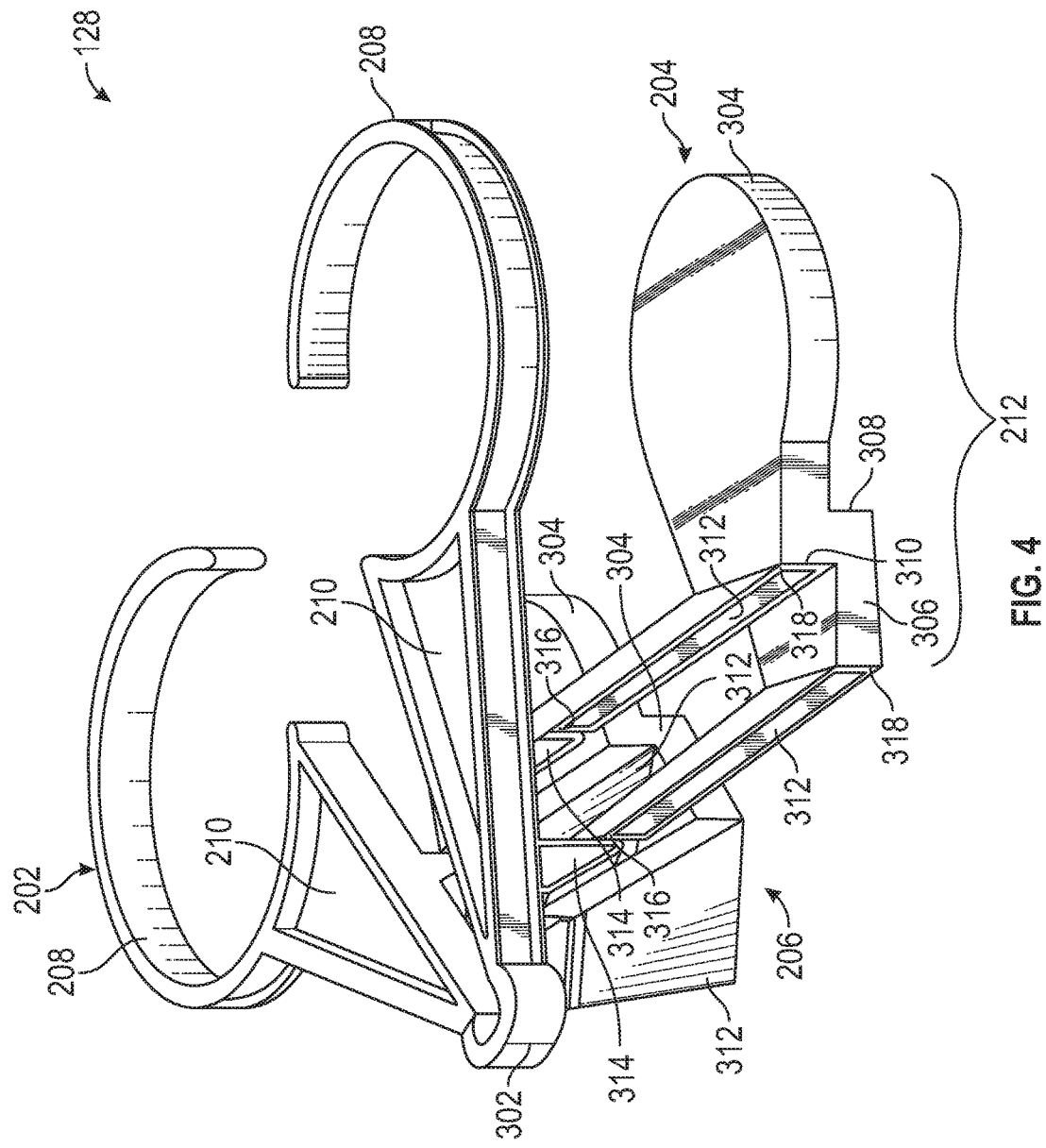
FIG. 4 is a schematic illustration of the cup holder mechanism of the cup holder system of FIGS. 1 and 2, depicted in the open position of FIG. 2, in accordance with an exemplary embodiment.

As depicted in FIGS. 2-4, in various embodiments, the upper region 202 comprises an outer ring 208 as well as extensions 210 and a connector 302. In certain embodiments, the extensions 210 are substantially triangular in shape; however, this may vary in other embodiments. In various embodiments, the outer ring 208 is configured to receive a beverage (e.g., beverage container 200 depicted in FIG. 2) by at least partially surrounding a side, perimeter, or circumference (collectively referred to as a perimeter of the beverage, for ease of reference) of the beverage container 200. In various embodiments, the outer ring 208 contains the beverage container 200 by not prohibiting or impeding substantial lateral movement of the beverage container 200.

In certain embodiments, the extensions 210 and connector 302 may collectively be designated as a connecting region (210, 302) that couples the outer ring 208 to the middle region 206. In addition, also in certain embodiments, the outer ring 208 is configured to expand, via the connecting region 210, 302, to accommodate beverages of different beverage container diameters, widths, or geometries, and/or to accommodate different types of beverage containers (e.g., cups, bottles, sippy-cups, jars, and so on). In various embodiments, the outer ring 208 expands in this manner, via the connecting region 210, 302, by relieving angular tension via a flexible plastic material, without a spring. In various embodiments, the outer ring 208 may be made of a flexible plastic, for example to allow it to accommodate different beverage containers of different shape, size, and weight. As used herein, the term "flexible plastic" includes types of plastic that have relatively higher elastic characteristics as compared with other materials, such as glass fibers or minerals, which could have brittle characteristics. In certain embodiments, flexible plastic materials would include, but would not be limited to, plastic types such as low density polyethylene (LPDE) materials (e.g., ranging in thickness from 0.5 mil to about 40 mil thick, in one embodiment), among other flexible plastic materials. It will be appreciated that different plastic materials, and/or other types of materials (e.g., wood or metal), may be used in certain embodiments. Also in one embodiment, at the end of the outer ring 208, a plastic "belt" may be utilized, and can provide a relatively more rigid support by fixing the outer ring 208 to one of the predefined circumferences of the beverage container. Also in one embodiment, connection region 302 may function similar to salad tongs for grasping a beverage container. Also in one embodiment, the connection region 302 is primary used to compress the two rings together for storage.

In various embodiments, the base region 204 comprises one or more base support elements 212. In the depicted example of FIGS. 2-4, the base region 204 includes two base support elements 212. However, this may vary in other embodiments. In addition, in various embodiments, as depicted in FIGS. 2-4, each base support element 212 comprises a first base support element component 304 and a second base support element component 306. In certain embodiments, the first base support element component 304 is substantially circular in shape and the second base support element component 306 is substantially trapezoidal in shape; however, this may vary in other embodiments.

In various embodiments, the first base support element component 304 is configured to contact and support the bottom of the beverage container 200. Also in various embodiments, the second base support element component 306 is connected to and disposed beneath the first base support element component 304, with a step 308 formed between the first base support element component 304 and the second base support element component 308. In various embodiments, the step 308 results in a support stop 310 to stop movement of the middle region 206.

In various embodiments, the middle region 206 connects the upper region 202 and the base region 204. As depicted in FIGS. 2-4, in various embodiments, the middle region 206 includes a plurality of protrusions 314 and a four bar assembly 312. In various embodiments, the four bar assembly 312 couples the plurality of protrusions 314 to the base support elements 304. In various embodiments, the protrusions 314 are substantially trapezoidal in shape and the four bar assembly 312 has components that are substantially rectangular in shape; however, this may vary in different embodiments.

In addition, in various embodiments, the middle region 206 further comprises a plurality of living hinge systems 316, 318. Specifically, in one embodiment, a first living hinge system 316 is coupled between each of the plurality of protrusions 314 and the four bar assembly 312. In addition, also in various embodiments, a second living hinge system 318 is coupled between the four bar assembly 312 and each base support element 304. In one embodiment, each living hinge system 316, 318 comprises a relatively thin piece of plastic that connects 314 to 312 and 312 to 318. In various embodiments, the living hinge allows the three sections to be molded together while still allowing for compact packaging. Also in various embodiments, the shape of the living hinge provides a hard stop for the various component to allow the system to support the weight of the containers. Also in one embodiment, the inter-relationship between the various components described above provided for improved functioning of the cup holder system 102. In certain embodiments, the geometry of the components can vary depending on the customer needs, packaging space, and force requirements. Also in certain embodiments, for a narrower cross-car packaging space, component 204 is designed with a flat spot on its inboard side so it does not take a full circular shape. However, this may vary in other embodiments.

In various embodiments, as depicted in FIGS. 2-4, the cup holder mechanism 128 has a relatively larger and more expanded lateral dimension, profile, and size when in the open position of FIGS. 2 and 4, and a relatively smaller and more compacted lateral dimension, profile, and size when stowed inside the recess 126 when in the closed position of FIG. 3.

Also in various embodiments, each of the components of the cup holder mechanism 128 are made from plastic, most preferably a flexible plastic that acts as a natural spring (without requiring a separate spring). In certain embodiments, certain regions of the cup holder mechanism 128 are designed to be stiffer through the use of ribs or thicker material. Also in certain embodiments, the living hinges are made of nylon, polypropylene and Polyethylene. In certain embodiments, one or more of the components may be made of one or more other materials, such as one or more wood and/or material materials, by way of examples.

Also in various embodiments, each of the components of the cup holder mechanism 128 may be manufactured by a single manufacturing tool used for the single, unitary piece that comprises the various components of the cup holder mechanism 128. In certain embodiments, the upper region 201 of the system may be manufactured in the open position so that the component will naturally want to return to that position, (e.g., being or resembling a built in spring). Also in certain embodiments, the middle region 206 and the base region 204 may be molded in a position that is in between the open and closed position to allow for enough space for tooling. Also in certain embodiments, manufacturing of the product may require a minimum of a core, cavity, and two side actions.

Accordingly, the systems, vehicles, and mechanisms described herein provide for potentially improved cup holder mechanisms and systems. The disposed cup holder mechanisms and systems provide for potentially improved holding of beverages of occupants of the vehicle, while maintaining a single, unitary structure that can result in improved performance and/or reduced manufacturing and/or maintenance costs.

It will be appreciated that the cup holder mechanisms, systems, and vehicles may vary from those depicted in the Figures and described herein. For example, the vehicle 100, the cup holder system 102, the cup holder mechanism 128, and/or various components thereof may vary from those depicted in FIGS. 2-4 and described in connection therewith, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cup holder mechanism for a vehicle, the cup holder mechanism comprising:
    an upper region comprising an outer ring configured to receive a beverage by at least partially surrounding a perimeter of the beverage;
    a base region comprising a base support element configured to support a bottom of the beverage; and
    a middle region connecting the upper region and the base region;
    wherein the cup holder mechanism is configured to be movable, by an actuator based on input provided by an occupant of the vehicle, between:
        a closed position, in which the cup holder mechanism is stowed in a recess within a housing; and
        an open position, in which the cup holder mechanism is opened outside the housing to receive the beverage; and
    wherein the upper region, the base region, and the middle region are formed as a single unitary piece.

2. The cup holder mechanism of claim 1, wherein the cup holder mechanism is configured to be stored in a center console of the vehicle, between a driver seat and a passenger seat of the vehicle.

3. The cup holder mechanism of claim 1, wherein the upper region further comprises:
    a connecting region coupling the outer ring to the middle region, wherein the outer ring is configured to expand, via the connecting region, to accommodate beverages of different widths.

4. The cup holder mechanism of claim 1, wherein the base support element comprises:
    a first base support element component configured to contact the bottom of the beverage; and
    a second base support element component connected to and disposed beneath the first base support element component, with a step formed between the first base support element component and the second base support element component.

5. The cup holder mechanism of claim 1, wherein the middle region comprises:
    a plurality of protrusions extending from the upper region; and
    a four bar assembly coupling the plurality of protrusions to the base support element.

6. The cup holder mechanism of claim 5, wherein the middle region further comprises one or more living hinge systems.

7. The cup holder mechanism of claim 6, wherein the one or more living hinge systems comprise:
    a first living hinge system coupled between each of the plurality of protrusions and the four bar assembly; and
    a second living hinge system coupled between the four bar assembly and the base support element.

8. A cup holder system for a vehicle, the cup holder mechanism comprising:
    a housing having a recess formed therein;
    a cup holder mechanism comprising:
        an upper region comprising an outer ring configured to receive a beverage by at least partially surrounding a perimeter of the beverage;
        a base region comprising a base support element configured to support a bottom of the beverage; and a middle region connecting the upper region and the base region;

wherein the upper region, the base region, and the middle region are formed as a single unitary piece;

an input device configured to receive an input from an occupant of the vehicle; and an actuator configured to, based upon the input received by the input device, to facilitate movement of the cup holder mechanism between:

a closed position, in which the cup holder mechanism is stowed in the recess within the housing; and an open position, in which the cup holder mechanism is opened outside the housing to receive the beverage.

9. The cup holder system of claim 8, wherein the cup holder system is configured to be stored in a center console of the vehicle, between a driver seat and a passenger seat of the vehicle.

10. The cup holder system of claim 8, wherein the upper region further comprises:

a connecting region coupling the outer ring to the middle region, wherein the outer ring is configured to expand, via the connecting region, to accommodate beverages of different widths.

11. The cup holder system of claim 8, wherein the base support element comprises:

a first base support element component configured to contact the bottom of the beverage; and a second base support element component connected to and disposed beneath the first base support element component, with a step formed between the first base support element component and the second base support element component.

12. The cup holder system of claim 8, wherein the middle region comprises:

a plurality of protrusions extending from the upper region; and a four bar assembly coupling the plurality of protrusions to the base support element.

13. The cup holder system of claim 12, wherein the middle region further comprises one or more living hinge systems.

14. The cup holder system of claim 13, wherein the one or more living hinge systems comprises a first living hinge system coupled between each of the plurality of protrusions and the four bar assembly; and a second living hinge system coupled between the four bar assembly and the base support element.

15. A vehicle comprising:

a driver seat;

a passenger seat;

a center console disposed between the driver seat and the passenger seat; and a cup holder system comprising:

a housing disposed within the center console, the housing having a recess formed therein;

a cup holder mechanism disposed within the center console, the cup holder mechanism comprising:

an upper region comprising an outer ring configured to receive a beverage by at least partially surrounding a perimeter of the beverage;

a base region comprising a base support element configured to support a bottom of the beverage; and a middle region connecting the upper region and the base region;

wherein the upper region, the base region, and the middle region are formed as a single unitary piece;

an input device configured to receive an input from an occupant of the vehicle; and an actuator configured to, based upon the input received by the input device, to facilitate movement of the cup holder mechanism between:

a closed position, in which the cup holder mechanism is stowed in the recess within the housing; and an open position, in which the cup holder mechanism is opened outside the housing to receive the beverage.

16. The vehicle of claim 15, wherein the upper region further comprises:

a connecting region coupling the outer ring to the middle region, wherein the outer ring is configured to expand, via the connecting region, to accommodate beverages of different widths.

17. The vehicle of claim 15, wherein the base support element comprises:

a first base support element component configured to contact the bottom of the beverage; and a second base support element component connected to and disposed beneath the first base support element component, with a step formed between the first base support element component and the second base support element component.

18. The vehicle of claim 15, wherein the middle region comprises:

a plurality of protrusions extending from the upper region; and a four bar assembly coupling the plurality of protrusions to the base support element.

19. The vehicle of claim 18, wherein the middle region further comprises a plurality of living hinge systems.

20. The vehicle of claim 19, wherein the one or more living hinge systems comprise:

a first living hinge system coupled between each of the plurality of protrusions and the four bar assembly; and a second living hinge system coupled between the four bar assembly and the base support element.

* * * * *